United States Patent [19]

Crissy et al.

[11] 4,091,744
[45] May 30, 1978

[54] PORTABLE DECK CLEAT

[75] Inventors: Charles F. Crissy; Christopher L. T. Corbin, both of Jackson, Mich.

[73] Assignee: Aeroquip Corporation, Jackson, Mich.

[21] Appl. No.: 735,456

[22] Filed: Oct. 26, 1976

[51] Int. Cl.² ............................................. B60P 7/08
[52] U.S. Cl. ................................ 105/475; 24/221 R; 244/115
[58] Field of Search .................... 105/475–485, 105/366 C; 248/222.1, 222.3, 217.4; 24/221 R, 221 A, 221 K; 244/115; 114/230, 218

[56] References Cited

U.S. PATENT DOCUMENTS

| | | | |
|---|---|---|---|
| 1,719,136 | 7/1929 | Rosenberg | 248/217.4 X |
| 2,086,928 | 7/1937 | Tiryakian | 248/217.4 |
| 2,664,611 | 10/1954 | Shomber | 105/483 X |
| 2,962,245 | 11/1960 | Molzan et al. | 105/475 X |
| 3,125,965 | 3/1964 | Penti et al. | 105/366 C |
| 3,331,333 | 7/1967 | Coulson | 105/366 C X |
| 3,701,562 | 10/1972 | Carr | 105/366 C X |

Primary Examiner—Albert J. Makay
Attorney, Agent, or Firm—Collins, Oberlin & Darr

[57] ABSTRACT

A portable tie-down device detachably mounted to a recessed anchor having a plurality of crossbars. The tie-down device includes a stationary stabilizer plate having a like plurality of depending torque lugs engaging the sides of the crossbars and a body member rotatable between two positions and having a like plurality of engaging dogs alignable with the torque lugs in one position and engageable with the anchor crossbars in the other position for detachably securing the tie-down device to the anchor. A manually operable locking bolt carried by the body member and selectively engageable with a locking groove in the stabilizer mechanically locks the rotatable body member to the stabilizer on the one position, thereby locking the tie-down device to the anchor. The locking bolt is provided with a handle having a weighted element at its free end which lies flush with the top surface of the stabilizer plate in its locked position and extends upright in its unlocked position, thereby visibly indicating that the tie-down device is either locked or unlocked to the anchor.

9 Claims, 6 Drawing Figures

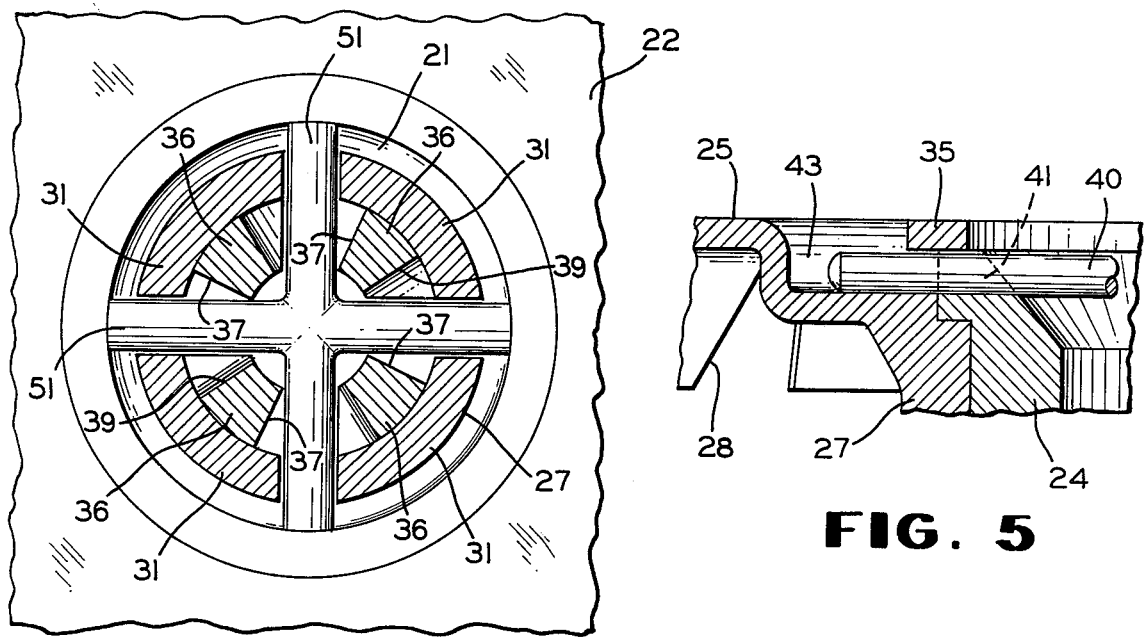
FIG. 4
FIG. 5
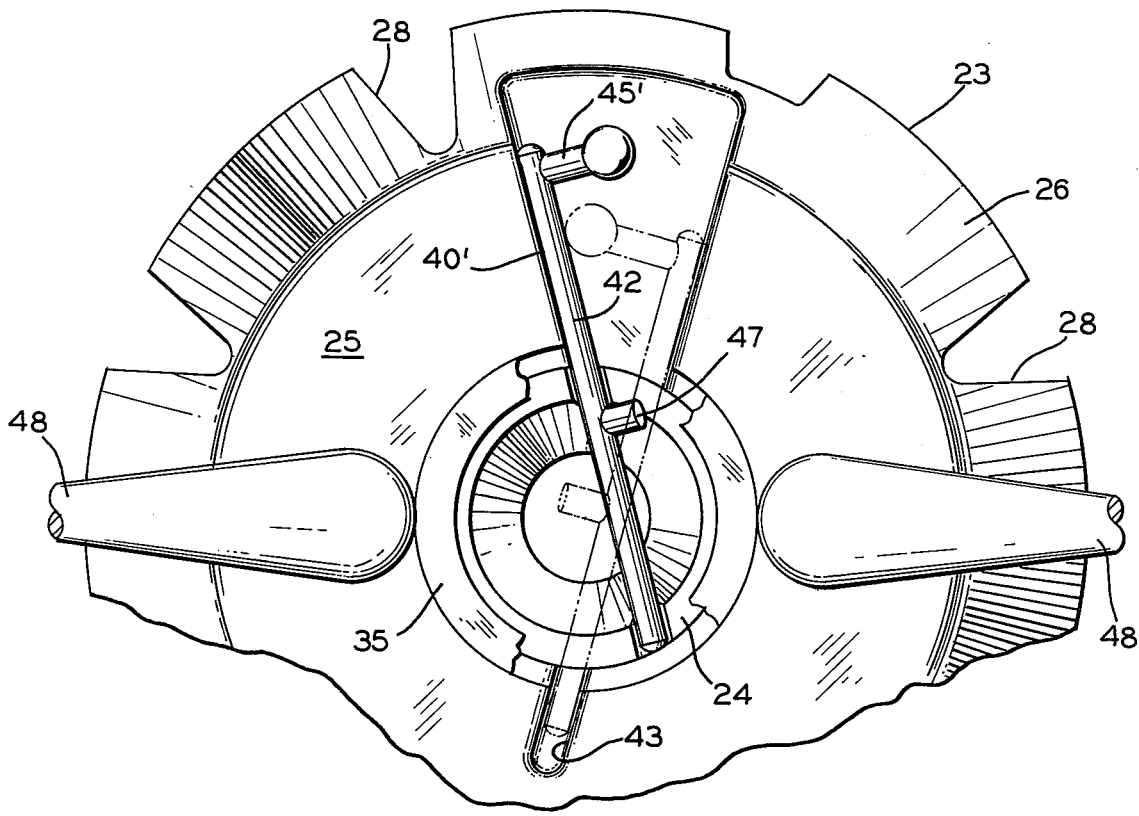
FIG. 6

PORTABLE DECK CLEAT

BACKGROUND OF THE INVENTION

1. Field of the Invention

This invention generally relates to portable tie-down devices attachable to anchor means, and more particularly to improvements in the means for demountably attaching the tie-down device to the anchor means.

2. Description of the Prior Art

An example of this type of tie-down device is disclosed in the attachment fitting illustrated in U.S. Pat. No. 2,962,245, issued on Nov. 29, 1960. The attachment fitting disclosed therein generally comprises a five-spoke dog type body structure and a four-spoke dog type body structure interconnected by a stud. A connecting sleeve is freely rotatably mounted on the stud and lies between the two body structures. Each body structure is similarly constructed and includes a body member having a plurality of engaging dogs such as parallel grooves with indentations in one side thereof to engage the spokes of a fixed anchor. A plurality of locking dogs provided on a spring urged collar lie in the grooves in the body structure to hold the anchor spokes in the indentation. The collar is moved away from the engaging dogs on the body structure to install the device and the engaging dogs are moved into position over the spokes and rotated until the spokes engage the aforementioned indentations. The collar is then released and the spring urges the locking dogs into the space between the engaging dogs, thus locking the spokes in the indentations in the body members. This prior art device has a number of disadvantages. Thus, a relatively large number of separate elements is required to make up the attachment fitting. Also, the collar is spring loaded and thus it may inadvertently permit the locking dogs to become disengaged from their respective grooves, permitting the attachment to "break free" from the anchor fitting during use.

SUMMARY OF THE INVENTION

Generally speaking, the instant invention overcomes the aforementioned disadvantages by providing a tie-down device that consists of only two parts and a means for mechanically locking the two parts together. More specifically, the tie-down device constructed in accordance with the invention includes a stationary body member or stabilizer plate having a counterbored apertured center section. The plate is provided with cleat horns and four vertically extending grooves in the annular wall of the center section for coacting with the crossbars of an anchor fitting. A four-bar dog member is rotatably disposed in the counterbored center section and held therein by a retainer ring. The annular wall of the dog member is provided with grooves that align with the grooves of the stabilizer plate in the one position and provide locking apertures in a second position. The dog is rotated between the two positions by a sliding type locking bolt having a weighted handle which lies in a position flush with the stabilizer plate when it is in its locked position. The weighted handle resists unintentional unlocking of the dog member, as well as visibly indicating whether the tie-down device is either in a locked or unlocked position relative to the anchor.

OBJECTS AND ADVANTAGES

Accordingly, an object of this invention is to provide a novel tie-down device that can be quickly and easily installed and removed from a recessed anchor fitting.

Another object of this invention is to provide a tie-down device which is constructed of a minimum number of parts, is easy to manufacture and assemble, and is mechanically locked to a recessed anchor fitting.

Yet another object of this invention is to provide a tie-down device which will withstand excessive tension forces regardless of the angle of application of the forces without distortion, warping, or breaking of the components of the tie-down device.

Other objects and advantages will become more apparent during the course of the following description when taken in connection with the accompanying drawings.

BRIEF DESCRIPTION OF THE DRAWINGS

In the drawings wherein like numerals are employed to designate like parts throughout the same:

FIG. 4 is a horizontal cross-sectional view taken substantially along the line 4—4 of FIG. 1 but showing the engaging dogs in an open position;

FIG. 5 is an enlarged fragmentary view of the end of the slide bolt interlocking the parts of the tie-down device together; and FIG. 6 is another embodiment of a locking bolt similar to that shown in FIG. 2.

DESCRIPTION OF THE PREFERRED EMBODIMENTS

Figure 1:
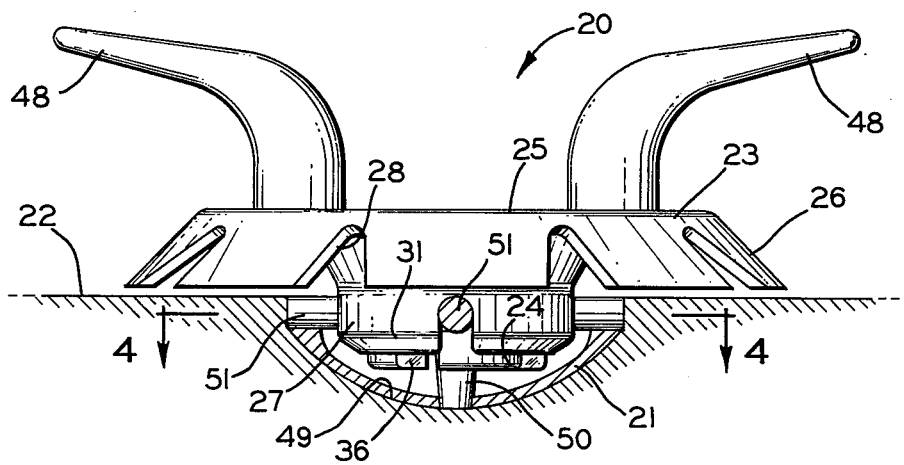
FIG. 1 is a side elevation, partly in section, of a tie-down device embodying the invention and mounted on a recessed anchor.

Referring now to the drawings, particularly FIG. 1, there is illustrated a portable tie-down device designated in its entirety by the reference numeral 20, which is adapted to be demountably connected to a conventional recessed cup-shaped anchor fitting 21 such as may be employed on the deck 22 of a ship (not shown).

The tie-down device 20 generally comprises an outer stationary stabilizer plate or first body member 23 and an inner dog or second body member 24 rotatably mounted in the stationary stabilizer plate 23. More specifically, the stationary stabilizer plate 23 is of inverted dish-shaped configuration with a horizontal top surface 25, a downwardly, angularly extending sidewall 26 and a central depending portion or hub 27 extending beyond the end of the side wall 26 for insertion into the anchor fitting 21. The end of the wall 26 is in a closely spaced relationship to the deck 22 for stabilizing the tie-down device 20 against vertical components of forces applied to the tie-down. The wall 26 also is provided with a plurality of triangularly shaped apertures 28 for permitting water or the like to be flushed therethrough for cleaning the component parts of the tie-down device to prevent binding therebetween. The depending portion or hub 27 has an axially extending bore 29 having a counterbore 30 at its top end for rotatably receiving the dog member 24. The other end of the hub 27 is provided with four vertically extending torque lugs 31 which are formed by cutting grooves 32 through a wall 33 of the hub 27. Each of the grooves 32 is arranged to accommodate one of the four crossbars of one of the recessed anchor fitting 21 which will be described in more detail hereinafter.

The dog member 24 is of a hollow cylindrical configuration and the top end thereof is provided with an outwardly extending flange 34 which coacts with the counterbore 30 so that the dog member is held in an axially spaced relation to the stabilizer plate 23. The dog member 24 is rotatably secured within the bore 29 of the stabilizer plate by a retainer ring 35 which is welded to the stabilizer plate.

Formed on the lower end of the rotatable dog member 24 and projecting downwardly therefrom are four engaging dogs 36 formed by providing grooves 37 through the wall 38 of the dog member 24. Each groove 37 is arranged to accommodate one of the four previously mentioned crossbars of the anchor fitting 21. Each of the grooves 37 is provided with an indentation 39 (See FIG. 4) in one side thereof in which one of the crossbars is disposed in the manner as hereinafter described. The grooves 37 of dog member 24 are alignable with the grooves 32 in the stabilizer plate 23 in one position and provide locking apertures in a second position.

Figure 2:
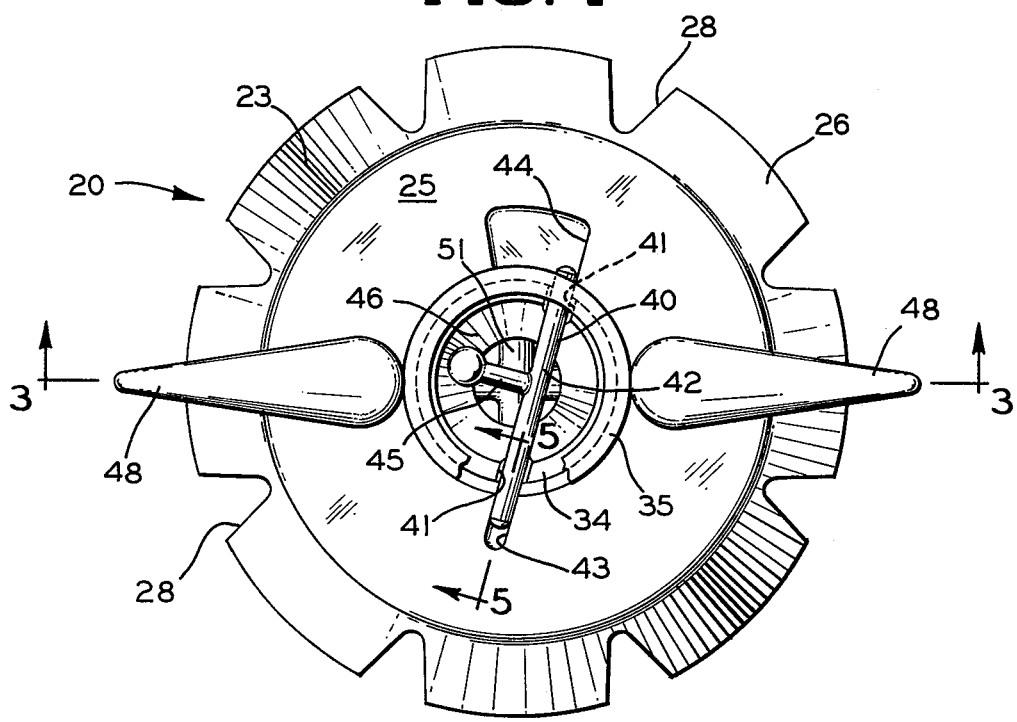
FIG. 2 is a plan view of the tie-down device shown in FIG. 1.

The dog member 24 is rotated between the two positions by a manually operable sliding type locking bolt 40. More specifically, the top end of the dog member 24 is provided with a pair of opposed grooves 41 (see FIG. 2) which receive an elongated cylindrical member 42 of the bolt 40 and which is held in the grooves 41 by the retainer ring 35. As best illustrated in FIGS. 2 and 5, the locking bolt is adapted to be moved into and out of engagement with a locking recess 43 provided on one side of the stabilizer plate 23. A sector shaped recess 44 is provided in the top surface 25 on the opposite side of the stabilizer plate 23 for permitting the cylindrical member 42 to be disengaged from the locking recess 43 and only engage the sector-shaped recess 44 so that the dog member may be rotated between the two previously described positions. In the embodiment of the invention illustrated in FIGS. 1-5, the locking bolt 40 is provided with a weighted arm or handle 45 that is disposed intermediate the ends of the member 42. As best seen in FIG. 2, the handle 45 is contained within the dog member 24, and when the cylindrical member 42 engages the locking recess 43 it will lie flush within a tapered counterbore 46 provided in the top end of the dog member 24. When the cylindrical member 42 is moved from the recess 43 the handle will lie at the top edge of the counterbore and project upwardly as shown in dotted lines in FIG. 3.

In the embodiment of the invention illustrated in FIG. 6, a handle 45' of a locking bolt 40' is affixed at one end of the cylindrical member 42 for convenient operation of the tie-down device. A stop pin 47 is then provided to retain the locking bolt within the rotatable dog member 24. The stop pin 47 performs the same function as does the handle 45 in the previously described embodiment.

The portable tie-down device 20 is completed by providing the top surface 25 of the stabilizer plate 23 with a pair of upstanding horns 48 as illustrated in the drawings, a padeye (not shown) or other desired types of tie-down connections.

Figure 3:
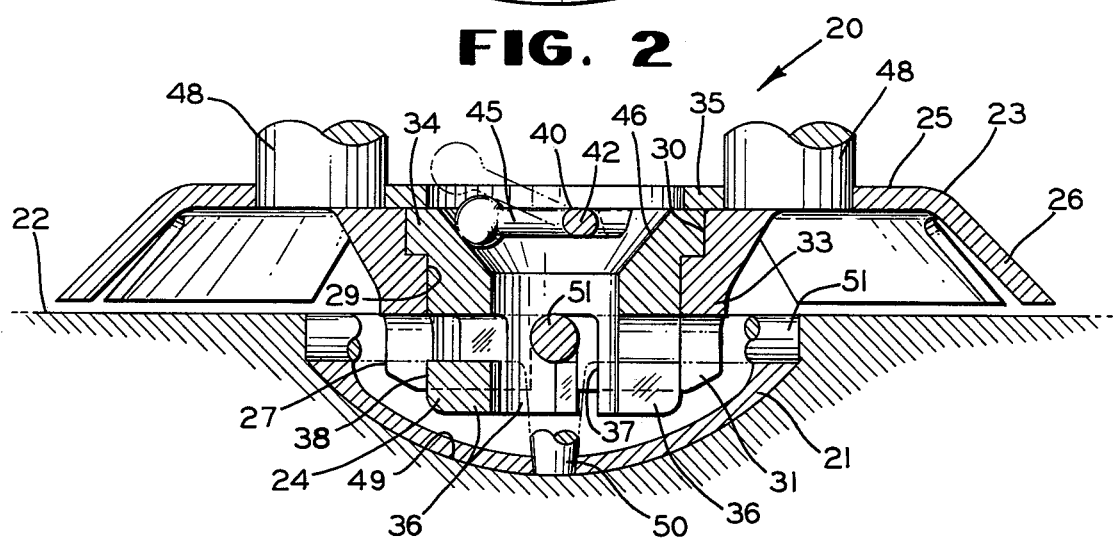
FIG. 3 is an enlarged vertical cross-sectional view taken substantially along line 3—3 of FIG. 2.

Referring now to FIGS. 1 and 3, the deck 22 is provided with a cup-shaped opening 49 that snugly receives the similarly shaped anchor fitting 21 which may be rigidly secured in the opening 49 by welding or other suitable means. The anchor fitting 21 includes at approximately the center thereof a vertical shaft 50 which has at its upper end a plurality, in this instance four, radially extending crossbars 51 which are approximately flush with the deck 22. The crossbars 51 are rigidly mounted at the sides of the cup-shaped anchor fitting 21 as by welding and span the distance between the vertical shaft 50 and the top surface of the anchor fitting 21.

When the anchor fitting 21 is equipped with four crossbars 31, such as shown in the drawings, the portable tie-down device is, of course, provided with four engaging dogs 36. However, it is also conventional practice to provide anchor fittings having five radiating crossbars; thus the tie-down device also would be provided with five engaging dogs instead of the four described.

In order to secure the tie-down device 20 to the anchor fitting 21, the dog member 24 is rotated in a counterclockwise direction so that the grooves 37 in the dog member 24 align with the grooves 32 in the stabilizer plate 23 as shown in FIG. 4. This unlocked position of the stabilizer plate and the dog member is shown by the disengaged position of the locking bolt shown in full lines in FIG. 6. Thus, the tie-down device can be inserted into the anchor fitting and the torque lugs 31 attached to the plate 23 engage the sides of the crossbars 51. The bolt 40 is then grasped to rotate the dog member 24 in a clockwise direction as illustrated in FIG. 6 so that its engaging dogs 36 engage the bottom surface of the crossbars 51. The bolt is then slid into the locking recess 43 in the top surface 25 of the stabilizer plate 23, and the handle 45 of the bolt is turned to a position wherein it lies flush within the surface 25 of the plate 23 to lock the dog member 24 to the stationary stabilizer plate, and thus the tie-down fitting 20 to the anchor fitting 21.

To remove the tie down fitting 20 from the anchor fitting 21, the operating handle 45 is simply lifted and the cylindrical member 42 is moved axially from the locking recess 43. The dog member 24 is then rotated in a counterclockwise direction as viewed in FIGS. 2 and 6 until the cylindrical member stops against the side of the sector shaped recess 44. The tie-down device 20 is then lifted from the anchor fitting 21. In this condition the handle 45 extends upwardly when the tie-down is in its unlocked position as indicated in dotted lines in FIG. 3.

It is to be understood that the form of the invention herewith shown and described is to be taken as an illustrative embodiment only of the same and that various changes in the shape, size and arrangement of parts may be resorted to without departing from the spirit of the invention.

We claim:

1. A tie-down device for releasable attachment to an anchor having a plurality of crossbars comprising:
   a. a stationary member;
   b. a plurality of torque lugs on said stationary member for engaging the crossbars;
   c. a rotatable member mounted on said stationary member;
   d. a plurality of locking dogs on said rotatable member alignable with said torque lugs in a first position;
   e. means for facilitating movement of said rotatable member from said first position to a second position for engaging said locking dogs with said crossbars; and f. means for locking said rotatable member to said stationary member in said second position, said locking means comprising: an elongated bolt member slidably mounted in said rotatable member, and said stationary member being provided with opposed recesses for engaging both ends of said bolt member in said second position, one of said recesses being substantially the same size as said bolt member and the opposite recess being circumferentially wider than said bolt member so that when said bolt member lies only in said wide recess and said rotatable member, said rotatable member can move relative to said stationary member between said first and said second positions.

2. A tie-down device for releasable attachment to an anchor as claimed in claim 1, wherein said bolt member includes a handle extending perpendicularly therefrom and said rotatable member is provided with an aperture for receiving said handle when said bolt member simultaneously engages both of said recesses in said second position.

3. A tie-down device for releasable attachment to an anchor as claimed in claim 2, wherein said handle is provided at an end of said bolt member and a pin is provided on said bolt member whereat is coacts with said rotatable member to prevent said bolt member from sliding out of said stationary member.

4. A tie-down device for releasable attachment to an anchor as claimed in claim 1, wherein the free end of said handle is provided with a weighted element.

5. A tie-down device for attachment to a recessed anchor having a plurality of horizontally disposed crossbars comprising:

a. a stationary plate member including a depending apertured center section and an outer depending wall for stabilizing said plate member;

b. a plurality of vertically extending torque lugs on said center section for engaging the sides of said crossbars;

c. a dog member rotatably disposed in said apertured center section;

d. a like plurality of engaging dogs depending from said dog member having portions aligned with said torque lugs in a first position and engaging said crossbars in a second position for releasably connecting said tie-down device to said anchor;

e. a retainer ring attached to said plate member for rotatably holding said dog member in said apertured center section of said plate member; and f. locking means carried by said dog member for engaging a recess in said plate member in said second position to mechanically lock said dog member to said plate member.

6. A tie-down device for releasable attachment to an anchor as claimed in claim 5, wherein said locking means comprises a sliding bolt member.

7. A tie-down device for releasable attachment to an anchor as claimed in claim 6, wherein said sliding bolt member includes a weighted handle.

8. A tie-down device for releasable attachment to an anchor, as claimed in claim 5, wherein said stabilizing means comprises an inverted dish-shaped member.

9. A tie-down device for releasable attachment to an anchor as claimed in claim 2 wherein the peripheral wall of said dish-shaped member is provided with a plurality of apertures for permitting flushing of debris from around said tie-down when it is attached to said anchor.

* * * * *

UNITED STATES PATENT AND TRADEMARK OFFICE
CERTIFICATE OF CORRECTION

PATENT NO. : 4,091,744

DATED : May 30, 1978

INVENTOR(S) : Charles F. Crissy et al

It is certified that error appears in the above-identified patent and that said Letters Patent are hereby corrected as shown below:

Claim 4, line 2, "1" should be --2--

Claim 9, line 2, "2" should be --8--

Signed and Sealed this

Thirty-first Day of October 1978

[SEAL]

Attest:

RUTH C. MASON
Attesting Officer

DONALD W. BANNER
Commissioner of Patents and Trademarks